United States Patent [19]

Deibel et al.

[11] 4,187,576
[45] * Feb. 12, 1980

[54] WIPER BLADE

[75] Inventors: Raymond A. Deibel, West Falls; Neil A. Gowans, Buffalo; William C. Riester, Williamsville, all of N.Y.

[73] Assignee: Trico Products Corporation, Buffalo, N.Y.

[*] Notice: The portion of the term of this patent subsequent to Aug. 8, 1992, has been disclaimed.

[21] Appl. No.: 965,496

[22] Filed: Dec. 1, 1978

Related U.S. Application Data

[63] Continuation of Ser. No. 860,669, Dec. 15, 1977, Pat. No. 4,127,912.

[51] Int. Cl.² .............................. B60S 1/04; B60S 1/38
[52] U.S. Cl. ............................. 15/250.42; 15/250.32; 403/120; 403/329
[58] Field of Search ................. 15/250.32, 250.42; 403/329, 120

[56] References Cited

U.S. PATENT DOCUMENTS

| 2,616,113 | 11/1952 | Scinta | 15/250.42 |
| 2,706,291 | 4/1955 | Rappl | 15/250.32 |
| 2,724,854 | 11/1955 | Oishei | 15/250.42 |
| 3,386,126 | 6/1968 | Hadekel | 15/250.42 |
| 3,879,793 | 4/1975 | Schlegel | 15/250.42 |
| 3,883,919 | 5/1975 | Harbison et al. | 15/250.32 |
| 4,127,912 | 12/1978 | Deibel et al. | 15/250.42 |

Primary Examiner—Peter Feldman
Attorney, Agent, or Firm—E. Herbert Liss

[57] ABSTRACT

An articulated windshield wiper blade superstructure for distributing applied pressure proportionately along the length of a wiper blade which includes a central primary lever and a pair of secondary end levers arranged end to end. The end levers are pivotally connected to the central levers. A single flat spring extends from end to end through the central lever. At each end it engages a projection on the end levers which extends inwardly of the pivotal connection. The spring functions to distribute the arm pressure to the end levers and also functions as a latch to retain the blade on the arm.

3 Claims, 12 Drawing Figures

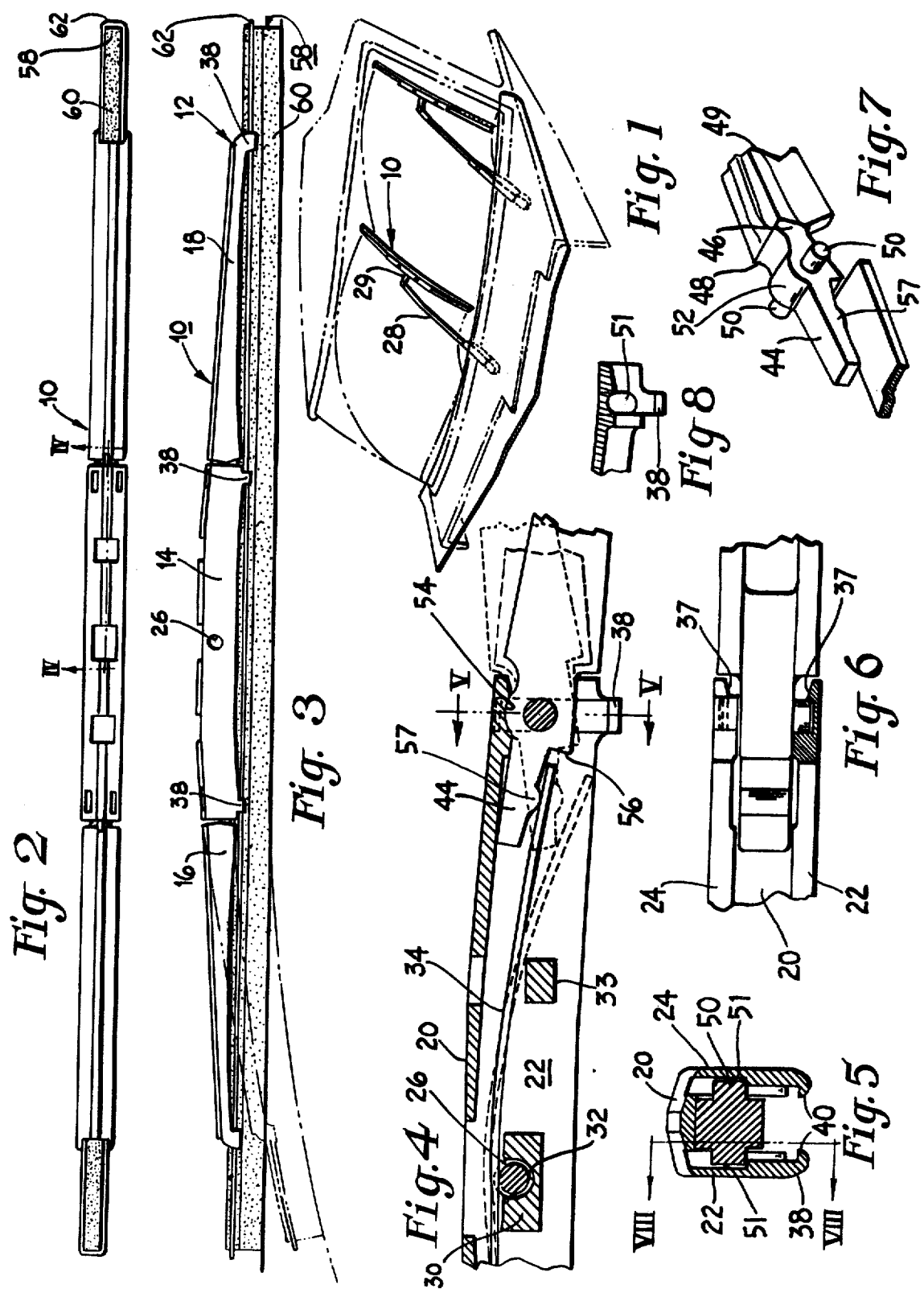

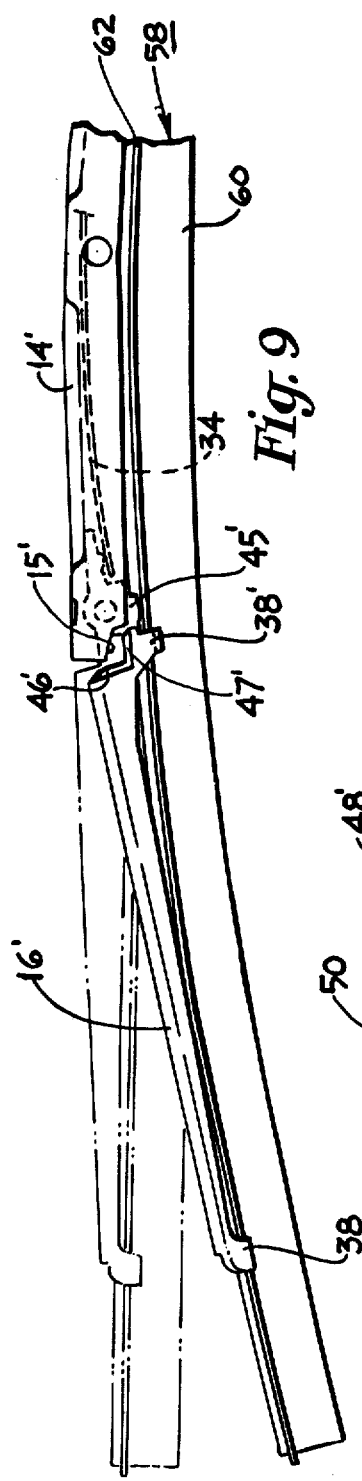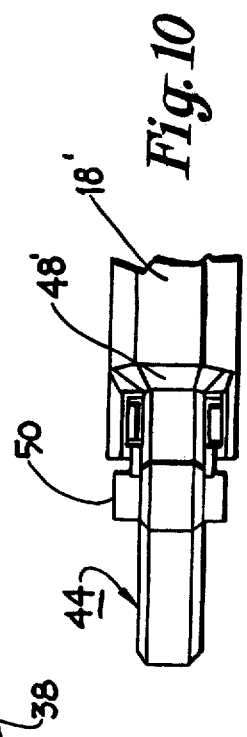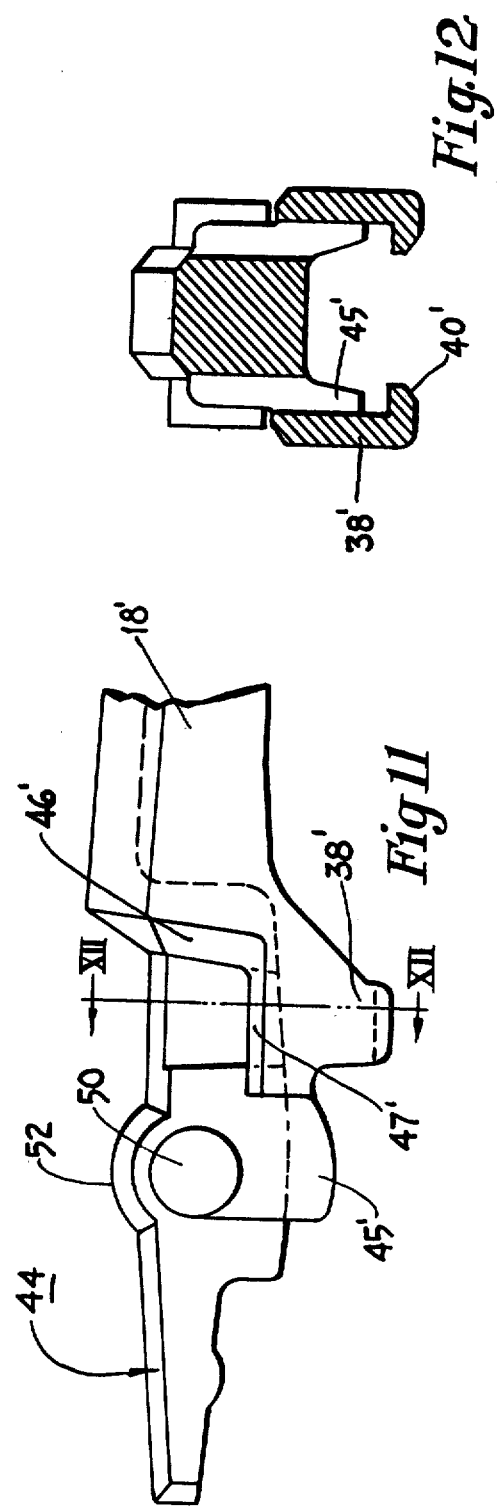

WIPER BLADE

This is a continuation of application Ser. No. 860,669, filed on Dec. 15, 1977, now U.S. Pat. No. 4,127,912.

BACKGROUND OF THE INVENTION

The invention relates to low profile windshield wiper blades and particularly to a pressure distributing superstructure which may be formed of plastic material as for example a reinforced thermoplastic polyester.

Currently windshield wiper blades with plastic superstructures which have been introduced to the market are of the triple yoke design. Such blades are inherently relatively high profile blades. In many modern automobiles the blades are stored in the park position, concealed beneath the cowl. It is desirable to maintain as low a profile as possible so that the blade can pass through the narrow slot provided to reach its concealed park position. Furthermore, a low profile blade is more resistant to windlift and is less distracting during operation. Blade superstructures having their levers pivotally connected and arranged end to end are known from the prior art. Examples of such arrangements are shown in Scinta U.S. Pat. No. 2,616,113 issued Nov. 4, 1952, Hadekel U.S. Pat. No. 3,386,126 issued June 4, 1968 and Schlegel U.S. Pat. No. 3,879,793 issued Apr. 29, 1975. In the known prior art separate spring means are provided at each joint to transmit force between the levers. The separate springs increase the weight and complicate assembly techniques. The energy conservation program necessitates every component of a motor vehicle be as light weight as possible.

The Schlegel patent discloses a plastic blade of the type utilizing alternatively either a rubber torsion spring of cylindrical configuration or a coiled torsion spring at each joint. Hadekel discloses a superstructure which utilizes either a coil torsion spring at each joint or alternatively a compression spring straddling the joint. The Scinta patent discloses a flat leaf spring straddling each joint with a housing to enclose the spring and a connecting element to space the pivotal connections. In each of the assemblies described above a separate rivet or pin extends through the joint to form a pivotal axis and retains the levers in assembled relationship. The known constructions require complicated assembly techniques, additional parts not required in stacked lever blades and additional weight. The springs used in prior art construction require that the blade silhouette be extended to accomodate the diameter of the spring or, in the case of the Scinta patent, to accomodate the relatively high bow needed for obtaining the requisite spring force.

SUMMARY OF THE INVENTION

The present invention includes a primary central lever, a pair of secondary end levers pivoted together adjacent their respective ends in end to end relationship. The central lever is channel shaped in cross section and includes a flat spring nestled within the channel extending substantially from end to end of the central lever. The spring is fulcrumed medially intermediate the ends of the central lever. Each end lever includes an inwardly extending connecting projection disposed intermediate the base of the channel-shaped central lever and the spring. The projection engages the spring inwardly of the pivotal connection between the levers. At its center the flat spring intersects a transverse receptor formed by aligned openings through the legs of the channel-shaped member. The receptor receives a cantilever pin type connector on the wiper arms for side mounting of the blade on the arm as illustrated in U.S. Pat. No. 3,378,874 to Scinta, issued Apr. 23, 1968. The flat spring may be utilized as a releasable latching element.

The single flat spring arrangement eliminates the necessity for assembling two separate springs about a separate pivot pin as is required with coil springs. It also permits the close juxtaposition of the end levers with the central lever; it eliminates the need for a separate pivot pin and spring housing and also avoids the need for a connecting element between the levers as shown in the above-mentioned Scinta U.S. Pat. No. 2,616,113.

The construction of the blade is such as to allow simplified assembly methods or automated assembly techniques. Reduced end portions at the inner ends of the end levers are provided with a pair of aligned lugs extending laterally from opposite sides thereof to form a pivotal axis. The end edges of the side walls of the central lever are provided with ramps and a recess is provided to receive the laterally extending lugs. A centrally disposed brace extending laterally between the side walls of the central lever may be provided. The brace may be provided with a radius on its internal surface aligned with the aligned openings in the side walls of the central lever to form a transverse receptor. This serves as a bearing surface for the cantilever pin type arm connector. A flat spring is positioned within the channel between the braces and the base wall; it is fulcrumed about the centrally disposed brace. Thus the end levers can be thrust and the connecting projections can be snapped into the central lever with the aligned lugs engaging in the recesses of the side walls. This arrangement facilitates assembly. An inwardly facing shoulder on the inwardly extending projection on each end lever properly locates the flat spring. The central lever has a pair of opposed claws at each end depending from the side walls to receive a backing strip of a squeegee element therebetween. The end levers have a pair of opposed claws depending from the side walls adjacent each free end thereof for the same purpose. In an improved embodiment the claws are deleted from the central lever. In lieu thereof each end lever is provided with a pair of opposed claws depending from the side walls adjacent the inner ends of the levers. The claws may be provided with ramps on their inner surfaces so that the backing strip can be either snapped into place or slid between the claws in a conventional manner of assembly.

The principal object of the present invention is to provide a low silhouette lightweight blade having improved means for distributing the force applied by the arm to which it is adapted to be connected.

Another object of the invention is to provide a low silhouette blade in which the superstructure can be fabricated from plastic material and which minimizes the number of parts required and facilitates assembly.

A further object of the invention is to provide an improved superstructure for a windshield wiper blade which may be fabricated from plastic material and which readily lends itself to automated assembly.

Other objects and advantages of the invention will be apparent from the following detailed description taken in connection with the accompanying drawings.

BRIEF DESCRIPTION OF THE DRAWINGS

FIG. 1 is a fragmentary view of a motor vehicle having windshield wiper blades incorporating the invention;

FIG. 2 is a top elevational view of a blade assembly incorporating the present invention;

FIG. 3 is a side elevational view similar to FIG. 2;

FIG. 4 is a longitudinal sectional view taken on line IV—IV of FIG. 1;

FIG. 5 is a transverse section taken on line V—V of FIG. 4;

FIG. 6 is a fragmentary bottom elevational view illustrating the connection between the end levers and the central lever;

FIG. 7 is an exploded perspective of an end lever and the flat spring of this invention;

FIG. 8 is a partial longitudinal cross section taken on line VIII—VIII of FIG. 5, with parts removed;

FIG. 9 is a fragmentary side elevational view illustrating an improved modification of the invention;

FIG. 10 is a fragmentary top elevational view of an end lever used in the modification shown in FIG. 9;

FIG. 11 is a fragmentary side elevational view greatly enlarged of the end lever shown in FIG. 10; and FIG. 12 is a sectional view taken on line XII—XII of FIG. 11.

Referring now to the drawings there is disclosed a wiper blade 10 comprising a superstructure 12. The superstructure 12 includes a central primary lever 14 and a pair of end levers 16 and 18, the levers 14, 16 and 18 being pivotally connected end to end. The central lever is of channel shaped cross section as seen in FIG. 5 and includes a base wall 20 and a pair of side walls 22 and 24 depending from opposite edges of the base wall 20. The side walls 22 and 24 have centrally disposed aligned openings 26 which form a transverse receptor for mounting on a cantilever pin type wiper arm 28. A transverse brace 30 extends between side walls 22 and 24 at the openings 26 and is spaced from the base wall 20. A concave recess 32 is provided on the internal surface of brace 30 to form a full length bearing surface for the arm connector pin. A transverse brace 33 is disposed on each side of the brace 32 medially between the brace 30 and the ends of the center lever. The braces 33 extend between the legs 22 of the center lever; their surfaces facing the web 20 are spaced further from the web 20 than is the corresponding surface of the brace 30. A flat spring 34 is nestled within the channel shaped central lever 14 between the base wall 20 and the braces 30 and 33, the braces 30,33 forming medially disposed fulcrums intermediate the ends of the central lever 14. The spring 34 extends substantially from end to end of the center lever 14. A pair of opposed claws 38 depending from the side walls 24 are disposed at each end of the center lever 14. The claws are ramped as at 40 on their opposed surfaces.

The end levers 16 and 18 are of identical construction and, for purposes of brevity, only lever 16 will be described in detail. The end lever tapers from its inner end adjacent the center lever 14 toward its outer end. A pair of opposed claws having ramps 40 on the internal opposed surfaces depend from the side edges adjacent the outer end. The lever may be of any suitable cross section configuration as, for example, channel shaped as shown in the drawings, or it may be solid. A connecting projection 44 of reduced width and thickness extends from the inner end. The junction between the projection 44 and the remainder of the end levers 16 forms a shoulder 46 on each side thereof and a shoulder 48 on the upper side. The shoulders 46 slope from the center to the opposite ends forming an apex 49 at the center for a purpose to be explained hereinafter. The projection 44 is formed with a pair of laterally outwardly extending aligned lugs 50 which are received in recess 51 of the central lever 14 and form a pivotal axis. A convex radius as at 52 circumscribes the lugs 50 and engages a complimentary concave radius 54 in the base wall of the center lever 14 which together with the concavity of the base of recess 51 provides a journal and bearing for the connection between the lever 16 and the lever 14. An inwardly facing shoulder 56 provided on the connecting projection retains the spring 34 in proper longitudinal position. The lateral dimension of the connecting projection 44 is such as to snugly telescope between the side walls of the lever 14 with sufficient tolerance to permit free pivotal movement. The extended length of telescopic engagement with the center lever enhances resistance to twisting of the end levers 16 and 18 relative to the center lever.

The modified embodiment illustrated in FIGS. 9 through 12 incorporates certain improvements to cope with extraordinarily severe icing conditions and circumstances where unusual twisting stresses are applied. Ancillary advantages of the modified embodiment are improved distribution of the applied arm pressure and superior wiper element retention and control. The same reference numbers used in describing the embodiment illustrated in FIGS. 1 through 8 will be used to designate identical parts in the modified embodiment.

Referring to FIG. 9, the central primary lever 14' differs from the central primary lever 14 of the FIG. 1 embodiment in that the outboard ends of the side walls are angularly notched as at 15' for a purpose to be hereinafter described. Furthermore, the opposed claws 38 are omitted. In other relevant respects the center levers 14' and 14 are identical.

The two end levers 16' and 18' are identical and for purposes of brevity only the differences between lever 18' and the end levers of the FIG. 1 modification will be described in detail. Adjacent the inboard end of lever 18', straddling the connecting projection 44 outwardly of the lugs 50, there is formed a pair of depending opposed claws 38' which are ramped similarly to the claws 38 at 40. The shoulder 46' at the junction between the side surface of the projection 44 and the remainder of the end lever 18' is straight edged in profile. Shoulders 47' extend longitudinally along a portion of each of the side surfaces of the projection 44 in angular relationship to shoulder 46'. The claws 38' depend from the shoulder 47'. The shoulders 46' and 47' and the shoulder 48' formed by the junction between the upper surface of the projection 44 and the remainder of the end lever 18' are all chamfered. When the end lever 18' is assembled with the center lever 14' the shoulders 47' underlie the longitudinal shoulders 15' in the side walls of center lever 14'. This can best be seen in FIG. 9. The interfitting relationship between shoulders 46', 47' and notch 15' produces some of the above mentioned advantages of the modified embodiment.

Under extremely severe conditions icing could occur at the joint between the end lever 18' and the center lever 14'. The relationship of the notch 15' and the shoulders 46', 47' and 48' operate upon flexing of the joint during operation to eject ice formed therein. The chamfered shoulders 46', 47' and 48' operate to assist in this ejection process. The ice ejection process is enhanced when the parts are formed as in the preferred embodiments of plastic material due to the fact that ice is not persistent in its adherence to plastic. However, the de-icing effect would result if the superstructure were formed of metal or any other suitable or desirable material. It should also be noted that upon reverse flexing to disengage the wiper blade from the wiper arm as described hereinabove the shoulder 47' engages the longitudinal edge of notch 15' to serve as a stop to prevent excessive reverse flexing. Positioning of the claws 38' on the end lever 18' as described reduces the moment arm when a force is applied to the ends of the claws thereby rendering them less susceptible to flexing than when the claws depend from the longer side walls of the center lever as in the modifications of FIGS. 1 to 8. Furthermore, under extreme conditions when stresses are applied to twist or rotate the end lever 18' relative to the center lever 14' the side walls of the center lever 14' would tend to flex due to the canting of the projection 44, thus causing some slight spreading of the claws. In the FIG. 9 modification such twisting or turning of the end lever 18' relative to the center lever 14' would have no effect on the claws 38', thus insuring retention of wiper element 38 under the most extreme stress conditions.

Depending from each of the side surfaces of the projection 44 in the area of the lugs 50 is an ear 45' having a convex radius at its free end. When the backing strip 62 of wiping element 58 is inserted between the claws in the conventional manner the end of the ears 45' engage the upper surface of the backing strip 62 while the claws 38' engage the lower surface. This can best be seen in FIG. 9. Thus distribution of arm pressure is enhanced and better controlled through this dual engagement with the backing strip. This feature also increases the wiper blade element retention characteristics in that the ears 45' in cooperation with the claws 38' prevent inadvertent displacement of the wiping element by more positively aligning the backing strip and resisting twisting thereof.

To assemble the superstructure the flat spring 34 is nestled within the channel of center lever 14 or 14' between the braces 30 and 33 and the web 20. The free ends of the flat spring are then moved away from the web 20 toward the open side of the channel. The connecting projections 44 on the end levers 16 or 16' and 18 or 18' respectively are thrust lengthwise and telescoped into the ends of the channel formed by the center lever 14 or 14', the lugs 50 engaging the ramps 37 (provided for ease of assembly), and moved inwardly until the lugs 50 snap into the recess 51. The ends of the flat springs then engage a convex protruberance 57 on the under surface of the projection 44; the free ends of the end levers 16, 16' and 18, 18' are urged away from the base wall 20 of the central lever to form a flexible, resilient, pre-curved superstructure. In the FIGS. 1 through 8 embodiment the portion of shoulder 46 below the apex engages the edges of the legs or side walls of the center lever and cooperates therewith to limit the motion of the end levers. In both modifications the free end of the projection 44 engages the base wall 20 of the center lever to limit motion of the end levers. The flat spring 34 is biased so that the central portion thereof intersects the openings 26.

The wiping element 58 comprises a rubber squeegee 60 and a backing strip 62 extending the full length thereof in a known manner. The backing strip is preferably of resilient metal but may be of any suitable or desirable material. After the levers and flat spring have been assembled the wiping element can be inserted either by sliding between the claws, starting at one end and progressing through the claws of the center lever to the claws of the other end. Suitable means are provided for retaining the wiping element in the superstructure. The flexibility of the claws and the provision of ramps 40 thereon permit the squeegee element to be snapped into position in lieu of the conventional sliding assembly technique. The bias of the superstructure to a curved position results in the wiping element assuming a like curved position. When the assembled blade is pressed into contact with the windshield the blade will assume the contour of the windshield, both over flat portions and the maximum curved section.

The blade may be side mounted on arm 28 having a cantilever pin type arm to blade connector 29, the pin being received through aligned openings 26 in the center lever 14 or 14'. The plane of the flat spring 34 intersects the openings and lies between a pair of shoulders formed by a circumferential groove (not shown) on the pin 29 to latch the blade to the arm. The spring 34 urges the pin against the bearing surface 32 of brace 30 to thereby provide a stable pivotal arm to blade connection. The pressure of spring 34 on the pin 29 maintains a secure and quiet joint.

The blade 10 may be readily removed by flexing one or both end levers 16, 16' and/or 18, 18' to a reverse curvature (see broken line position in FIGS. 4 and 9) causing the free end of the connecting projection 44 to engage the spring 34. The spring then fulcrums about the braces 33. Thus the central area of the flat spring 34 will rise out from between the shoulders on the cantilever pin 24. The blade may then be easily slipped off. In the FIG. 1 embodiment the apex 49 at the inboard edges of the end levers 16 and 18 serves as a fulcrum point bearing against the end edges of the center lever 14 as the end levers are moved to a reversed curved position. The portion of the sloping surface 46 extending from the apex 49 to the upper surface of the superstructure bears against the end edge of the center lever 14 cooperating therewith to serve as a stop so that excessive reverse bending and consequent fracture will not occur. In the FIG. 9 embodiment this is accomplished by engagement of shoulder 47' with the horizontal portion of notch 15'. The braces 33 serve as a fulcrum point causing the center portion of the spring 34 to rise and bear against the web 20 of the center lever 14 or 14' when the end levers are flexed to a reversed curvature.

A unique wiper blade combination has been shown and described which is capable of being assembled by automation techniques and which is of extremely low profile. The structure is such as to simplify either manual or automated assembly techniques. A single flat spring is utilized to distribute pressure applied by the wiper arm to the end levers while the undistributed arm pressure is applied directly through the center lever to the center portion of the wiping pattern. The flat spring serves a dual function both as a latch member and as a pressure distributing spring. The blade has a pre-formed curvature to accomodate maximum windshield curvature as it traverses its path. Because the flat spring extends from one pivotal joint to the other its length results in equalized distribution of stress on the spring over a substantial distance which prolongs the life and effectiveness of the spring.

Although certain specific embodiments of the invention have been shown and described for the purpose of illustration it will be apparent that in its broader aspects various modifications and other embodiments are possible within the scope of the invention. It is to be understood, therefore, that the invention is not limited to the specific arrangement shown but in its broadest aspects it includes all equivalent embodiments and modifications which come within the scope of the invention.

What is claimed is:

1. In a windshield wiper blade assembly including a pressure distributing superstructure having a transverse receptor for pivotally receiving a wiper arm connecting pin, the pin having a circumferential recess forming a pair of opposed radially extending shoulders, said superstructure includes a spring positioned to span and chordally intersect said transverse receptor, means to bias said spring to a position wherein an intermediate portion is positioned to lie in said recess between said opposed shoulders for retaining said pin in said receptor; characterized in that a fulcrum means is disposed intermediate said receptor and one end portion of said spring, said fulcrum having its axis lying parallel to the axis of said transverse receptor and externally accessible means for applying a force at said one end portion of said spring in a direction against said fulcrum whereby application of such force effects movement of said intermediate portion of said spring to a position out of engagement with the circumferential recess and opposed shoulders to permit removal of said pin from said receptor.

2. In a windshield wiper assembly according to claim 1 including restraining means for limiting movement of the other end portion of said spring located on the side of said transverse receptor remote from said fulcrum in a plane parallel to the direction of the applied force to thereby effect bowing of said intermediate portion of said spring when said force is applied whereby the bowed portion moves to a position out of engagement with said circumferential recess and opposed shoulders.

3. In a windshield wiper assembly according to claims 1 or 2 a fulcrum is positioned on each side of said receptor and intermediate the receptor and an adjacent end of said spring and an externally accessible means for applying force is located respectively at each end portion outwardly of the adjacent fulcrum.

* * * * *